United States Patent
Donze

(10) Patent No.: US 11,010,484 B2
(45) Date of Patent: *May 18, 2021

(54) SYSTEM AND METHOD TO PROVIDE DOCUMENT MANAGEMENT ON A PUBLIC DOCUMENT SYSTEM

(71) Applicant: Altirnao, Inc., Wilmington, DE (US)

(72) Inventor: Stephane Donze, Walnut Creek, CA (US)

(73) Assignee: Altirnao, Inc.

( * ) Notice: Subject to any disclaimer, the term of this patent is extended or adjusted under 35 U.S.C. 154(b) by 343 days.

This patent is subject to a terminal disclaimer.

(21) Appl. No.: 15/782,286

(22) Filed: Oct. 12, 2017

(65) Prior Publication Data

US 2018/0039790 A1 Feb. 8, 2018

Related U.S. Application Data

(63) Continuation of application No. 14/284,359, filed on May 21, 2014, now Pat. No. 9,817,988.

(60) Provisional application No. 61/826,456, filed on May 22, 2013.

(51) Int. Cl.
*G06F 21/62* (2013.01)
*G06F 16/11* (2019.01)
*G06F 16/93* (2019.01)

(52) U.S. Cl.
CPC .......... *G06F 21/6218* (2013.01); *G06F 16/11* (2019.01); *G06F 16/93* (2019.01); *G06F 21/6272* (2013.01)

(58) Field of Classification Search
CPC ...... G06F 21/6218; G06F 16/93; G06F 16/11; G06F 21/6272
USPC .......................................................... 707/783
See application file for complete search history.

(56) References Cited

U.S. PATENT DOCUMENTS

| | | | |
|---|---|---|---|
| 6,397,231 B1 | 5/2002 | Salisbury et al. | |
| 6,584,466 B1 | 6/2003 | Serbinis et al. | |
| 7,149,959 B1 | 12/2006 | Jones et al. | |
| 9,817,988 B2 | 11/2017 | Donze | |
| 10,635,641 B1 | 4/2020 | Donze | |
| 2007/0033154 A1* | 2/2007 | Trainum | G06F 16/93 |
| 2007/0113187 A1* | 5/2007 | McMullen | G06F 21/6218 715/742 |
| 2009/0319529 A1 | 12/2009 | Bartlett | |
| 2010/0046029 A1 | 2/2010 | Suzuki et al. | |
| 2010/0241611 A1 | 9/2010 | Zuber | |
| 2010/0332401 A1 | 12/2010 | Prahlad | |
| 2011/0153560 A1 | 6/2011 | Bryant | |
| 2012/0137309 A1 | 5/2012 | Makam et al. | |
| 2012/0304262 A1 | 11/2012 | Cucco et al. | |
| 2013/0086060 A1 | 4/2013 | Donley et al. | |
| 2013/0219176 A1 | 8/2013 | Akella et al. | |
| 2013/0311894 A1* | 11/2013 | Rexer | G06Q 10/10 715/741 |
| 2014/0165176 A1* | 6/2014 | Ow | H04L 63/10 726/8 |
| 2014/0229839 A1 | 8/2014 | Lynch et al. | |

\* cited by examiner

*Primary Examiner* — Evan Aspinwall
(74) *Attorney, Agent, or Firm* — DLA Piper LLP (US)

(57) ABSTRACT

A system and method for document management are provided in which documents are managed in a file/document sharing system.

32 Claims, 10 Drawing Sheets

SYSTEM AND METHOD TO PROVIDE DOCUMENT MANAGEMENT ON A PUBLIC DOCUMENT SYSTEM

PRIORITY CLAIMS/RELATED APPLICATIONS

This application claims priority under 35 USC 120 and is a continuation of U.S. patent application Ser. No. 14/284,359, filed May 21, 2014 that is turn claims the benefit under 35 USC 119(e) of and claims priority under 35 USC 120 to U.S. Provisional Patent Application Ser. No. 61/826,456, filed on May 22, 2013 and entitled "System And Method To Provide Document Management On A Public Document System", the entirety of both of which are incorporated herein by reference.

FIELD

The disclosure relates generally to a system and method for document management in a public document system.

BACKGROUND

In most online file sharing systems such as Dropbox, Google Drive, SkyDrive, etc., files and/or documents are owned by individual people who are responsible for managing the sharing permissions of the document and/or file. Thus, each user decides which files and/or documents he or she wants to make public, which files and documents are private (visible only to the owner) and which files and/or documents may be shared with a limited set of users and/or groups.

This paradigm in which the files and/or documents are owned by the user is well suited for collaborative work among small teams, but does not scale up to large organizations with hundreds or thousands of users. In this paradigm, work-related documents that belong to the organization from a legal and intellectual property point of view, are "owned" in the document system by the individual users. Due to this ownership by an individual, critical information can be lost when an employee leaves the organization, or by accident when the owner deletes a file without realizing that it was shared and used by other co-workers.

There have been systems that have attempted to solve the above problems. One system is a cloud backup solution, such as for example Backupify, that addresses the problem of accidental data loss by storing copies of the files outside of the file sharing system. When a document is lost, the backup system can restore the backup copy. Another system is a security audit solutions, such as for example CloudLock, that addresses the problem of controlling the sharing permissions of the files. These tool perform a periodic scan of the files and provide a detailed report of which file(s) are shared with which users or groups, with a specific focus on files that are made visible outside of the organization.

These known backup and audit solutions are only a partial answer to the problem of managing corporate documents for several reasons. First, these tools only detect and fix problems that have already happened, finding and restoring a lost file can take time and audit tools can only find security breaches after (and sometimes, a long time after) the misconfiguration has been done. In addition, backup copies may be sometimes incomplete (for example, a backup copy of a Google Document only contains the content of the document, but not the collaborative comments attached to it). Furthermore, these tools do not address the "ownership" issue, which is the root cause of the problems: despite the deployment of a centralized backup system and a security audit tool, files are still owned by individual users rather than by the organization.

DETAILED DESCRIPTION OF ONE OR MORE EMBODIMENTS

The disclosure is particularly applicable to a cloud based document management system that interfaces with a public file sharing system, such as Google Drive and it is in this context that the disclosure will be described. It will be appreciated, however, that the system and method has greater utility since the document management system may be used with various file sharing systems and may be implemented in various ways that are known in the art.

Figure 1:
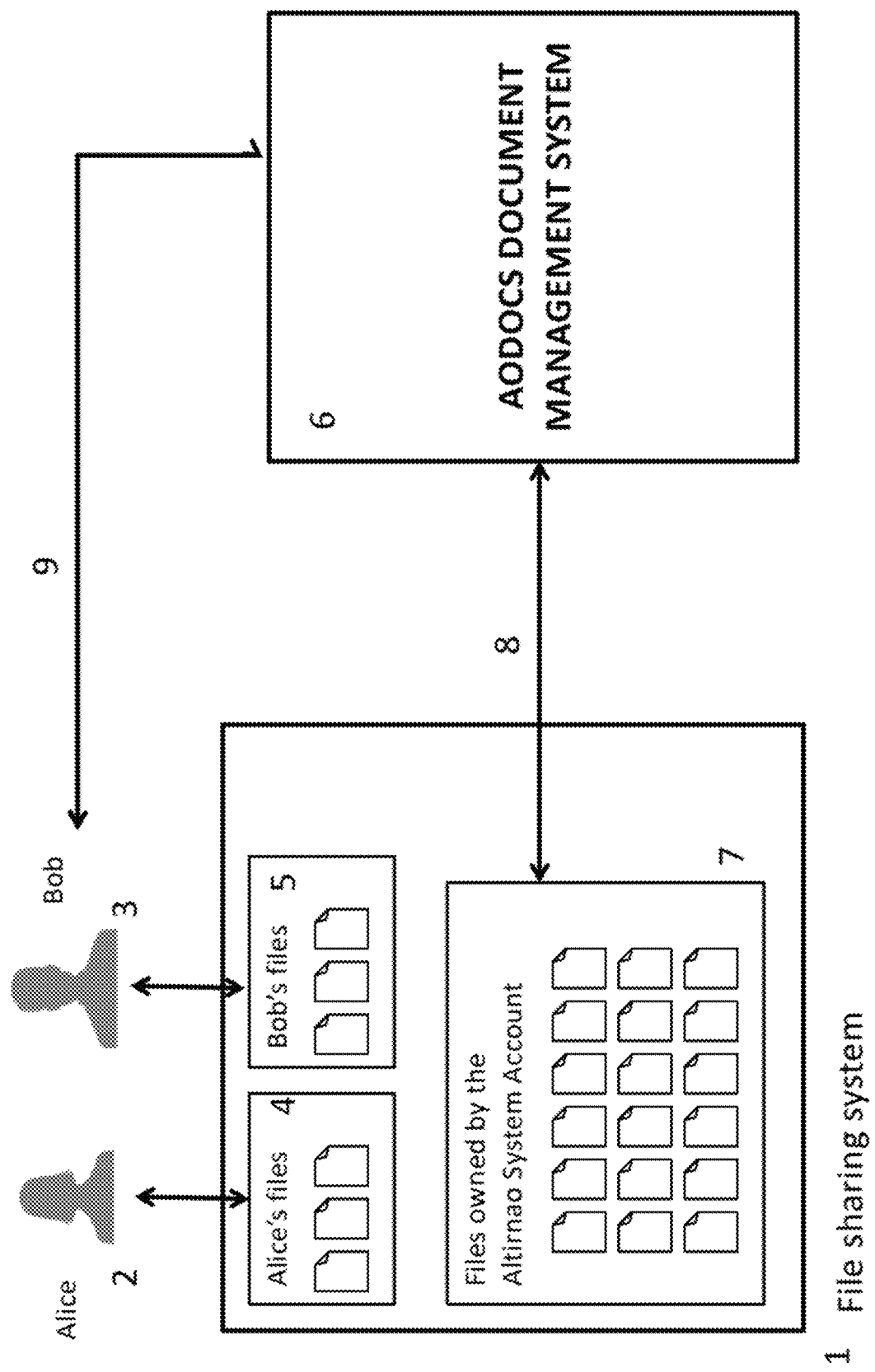
FIG. 1 illustrates an implementation of a document management system that works with a public document system.

FIG. 1 illustrates an implementation of a document management system 6 that works with a public document system 1 (that may also be a file sharing system.) In this implementation, the file sharing system may be a cloud computing based file sharing system, such as Google Drive for example, that may also provide online file storage. Two users of the file sharing system, such as Alice (2) and Bob (3) and can manage the files that they own (4), (5) within the file sharing system. If Alice and Bob are associated with a company and some of the files (4, 5) are company files, then the problem with this approach is that, when Bob or Alice leave the company, the company loses control and/or access to the files (4,5.) Thus, it is desirable to be able to allow users associated with a company to use the file sharing system and also allow the company to retain control over the files associated with each user. As shown in FIG. 1, a document management system 6, such as AODocs Document Management System for example, may be used in conjunction with the file sharing system 1. Each user, such as Alice and Bob as shown in FIG. 1, may access the file sharing system 1 using a computing device 202 (shown in FIG. 2A.) Each computing device may be a smartphone device, a phone device, a tablet computer, a personal computer, a terminal and other devices having at least a processor, memory, storage and circuitry for connectivity that allow the computing device to interact with the file sharing system 1 and the document management system 6. In some implementations, each computing device may store and execute a browser application that is used to interact with the file sharing system 1 and the document management system 6 is known manners using known protocols.

The document management system 6 may store one or more managed files (7) in the file sharing system 1 as shown. These one or more managed files (7) are "owned" by the document management system (6) on behalf of the company and thus those files can only be controlled (8) by the document management system (6.). When a user associated with the company wants to access a managed file (7), the user can not access those files directly, but instead needs to use an access point (9), such as an application programming interface (API), of the document management system (6). This ensures that, even when a user leaves the company, the company can still access and control the managed files (7) which means that a company can utilize the public file sharing system while retaining control over the managed files (7.).

Figure 2A:
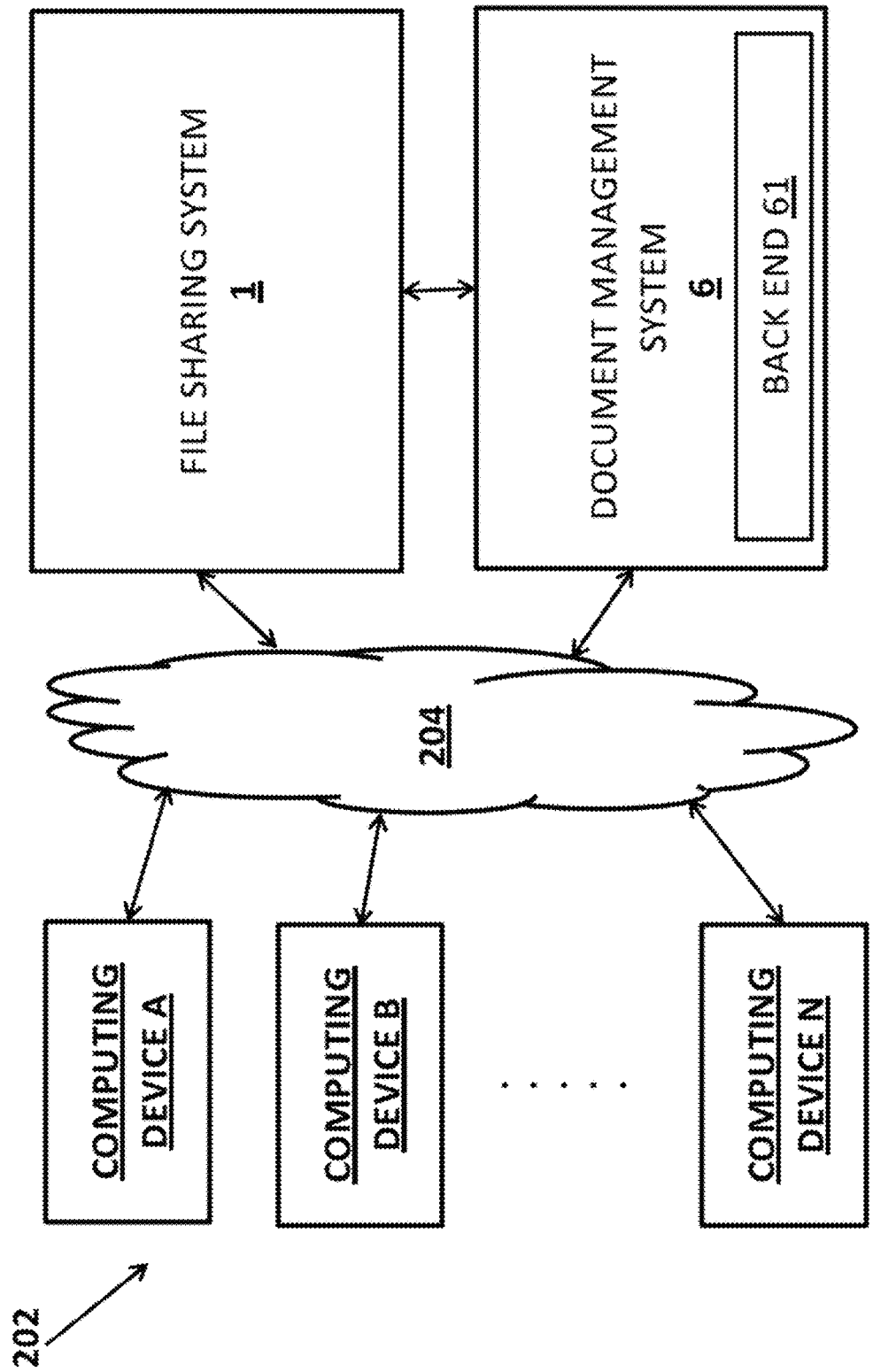
FIGS. 2A and 2B illustrate more details of the document management system in FIG. 1.
Figure 2B:
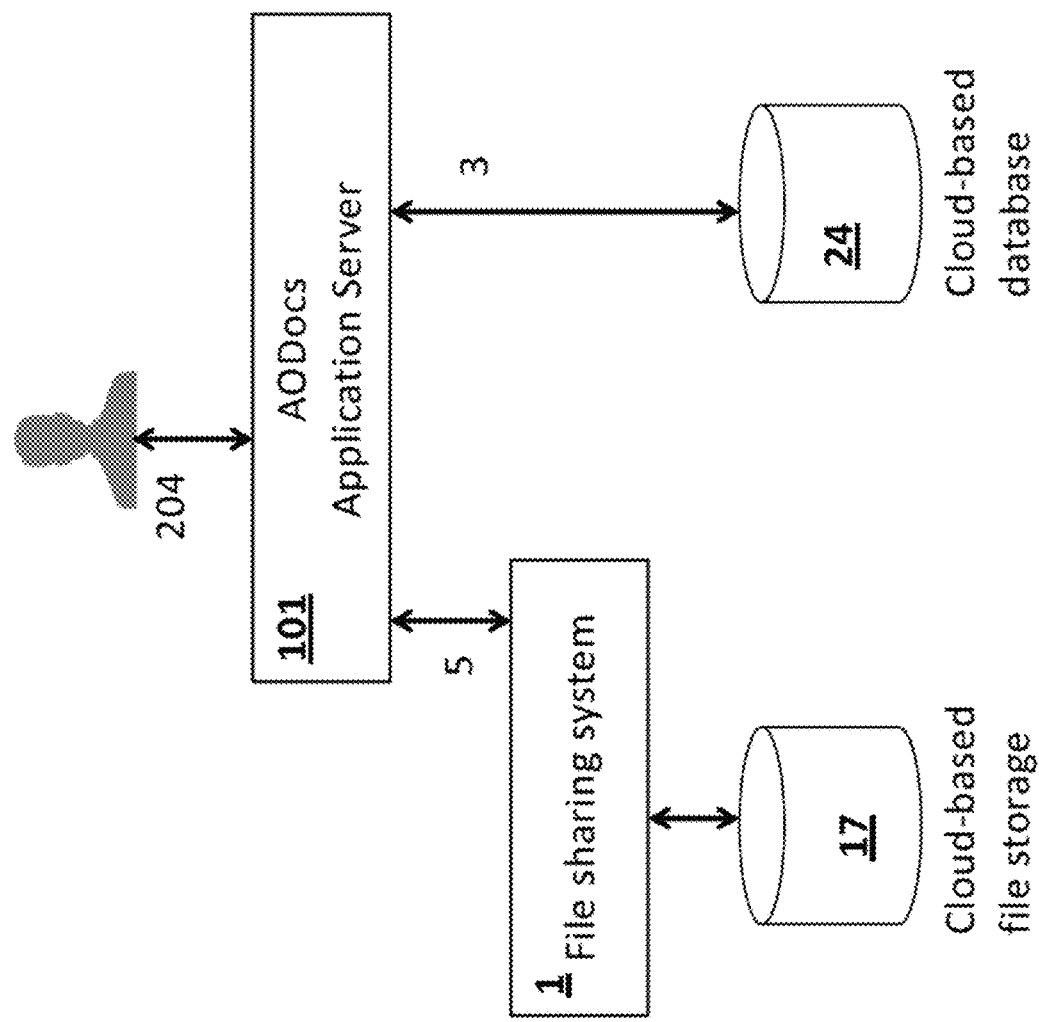

FIGS. 2A and 2B illustrate more details of the document management system in FIG. 1. As shown in FIG. 2A, the file sharing system 1 and the document management system 6 may be coupled to each other and then both may be coupled to a communications path 204 that allows each computing device 202, such as computing device A, computing device B, . . . , computing device N as shown in FIG. 2A, to interact with either the file sharing system or the document management system including the access point (9). The document management system 6 may be implemented using one or more cloud computing resources, one or more server computer and the like. In one implementation, the operations of the document management system 6 may be provided by a plurality of lines of computer code that executed on one or more processors of the one or more cloud computing resources or one or more server computers. The document management system 6 may also have a backend 61 that is described in more detail below with reference in FIG. 5. The file sharing system 1 also may be implemented using one or more cloud computing resources, one or more server computer and the like. In one implementation, the operations of the file sharing system 1 may be provided by a plurality of lines of computer code that executed on one or more processors of the one or more cloud computing resources or one or more server computers. The communications path 204 may be a wired or wireless path, such as the Internet, an Ethernet network, wireless data network, a computer network and the like.

As shown in FIG. 2B, each user may interact with a document management application server 101 (that is part of the document management system) using a Web browser and over the communications path 204. The server 101 may be running on the cloud-based infrastructure of the document management system described above. In one implementation, the application server may uses Google AppEngine (which is described in more detail at https://developers.google.com/appengine which is incorporated herein by reference.) The application server 101 may store the document properties (for the managed files 7 in FIG. 1) in a storage device (24), such as for example a cloud-based non-relational database. The document files may be stored in the storage (17) of the file sharing system, such as for example cloud based file storage. The file sharing system (1) has its own storage back-end (17), running on a cloud infrastructure. In one implementation, the storage device (24) may be a Google AppEngine Datastore and the storage of the file sharing system may use Google Drive (described in more detail at https://drive.google.com/start which is incorporated herein by reference.)

Figure 3:
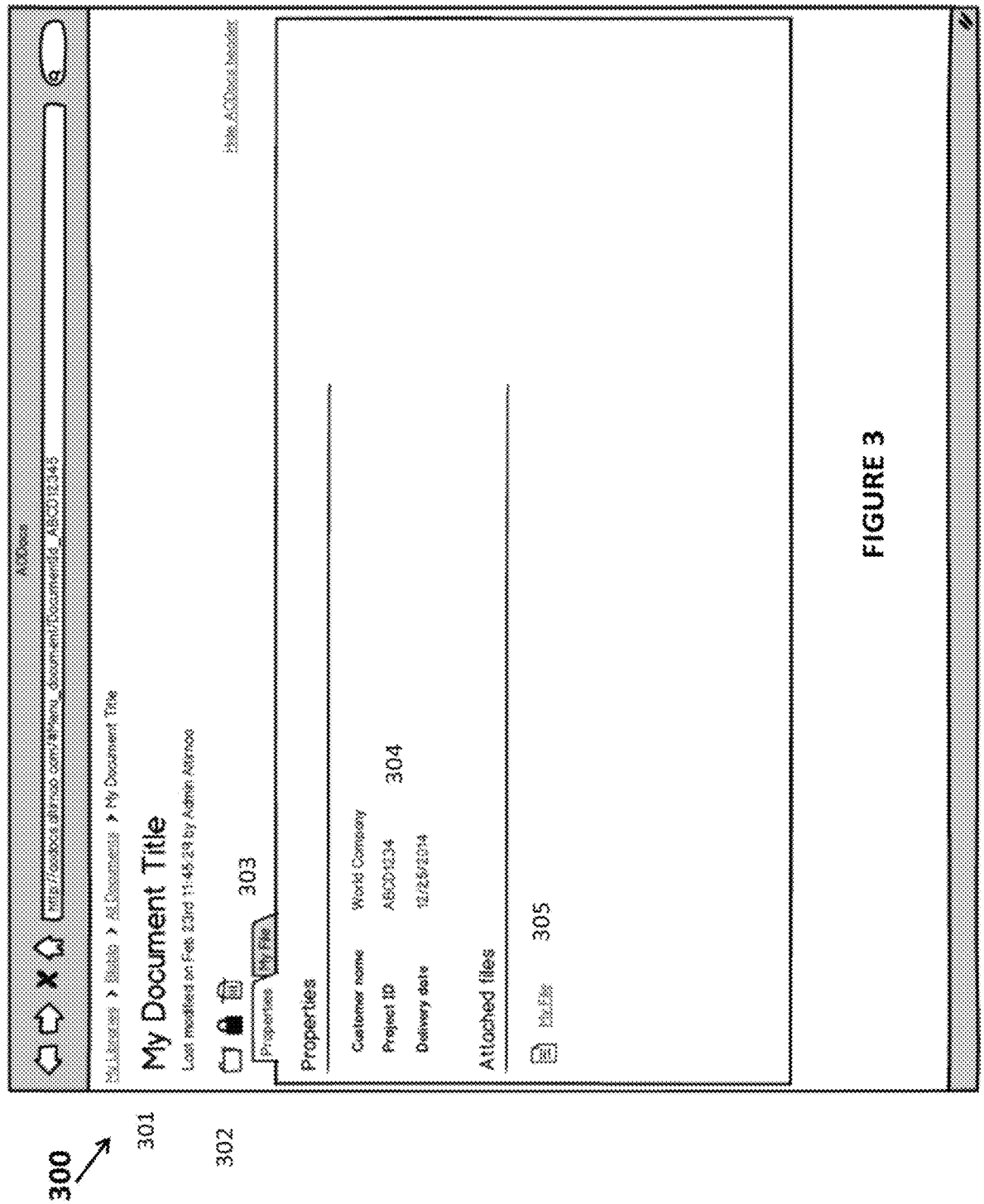
FIG. 3 illustrates an example of a document properties user interface of the document management system.
Figure 4:
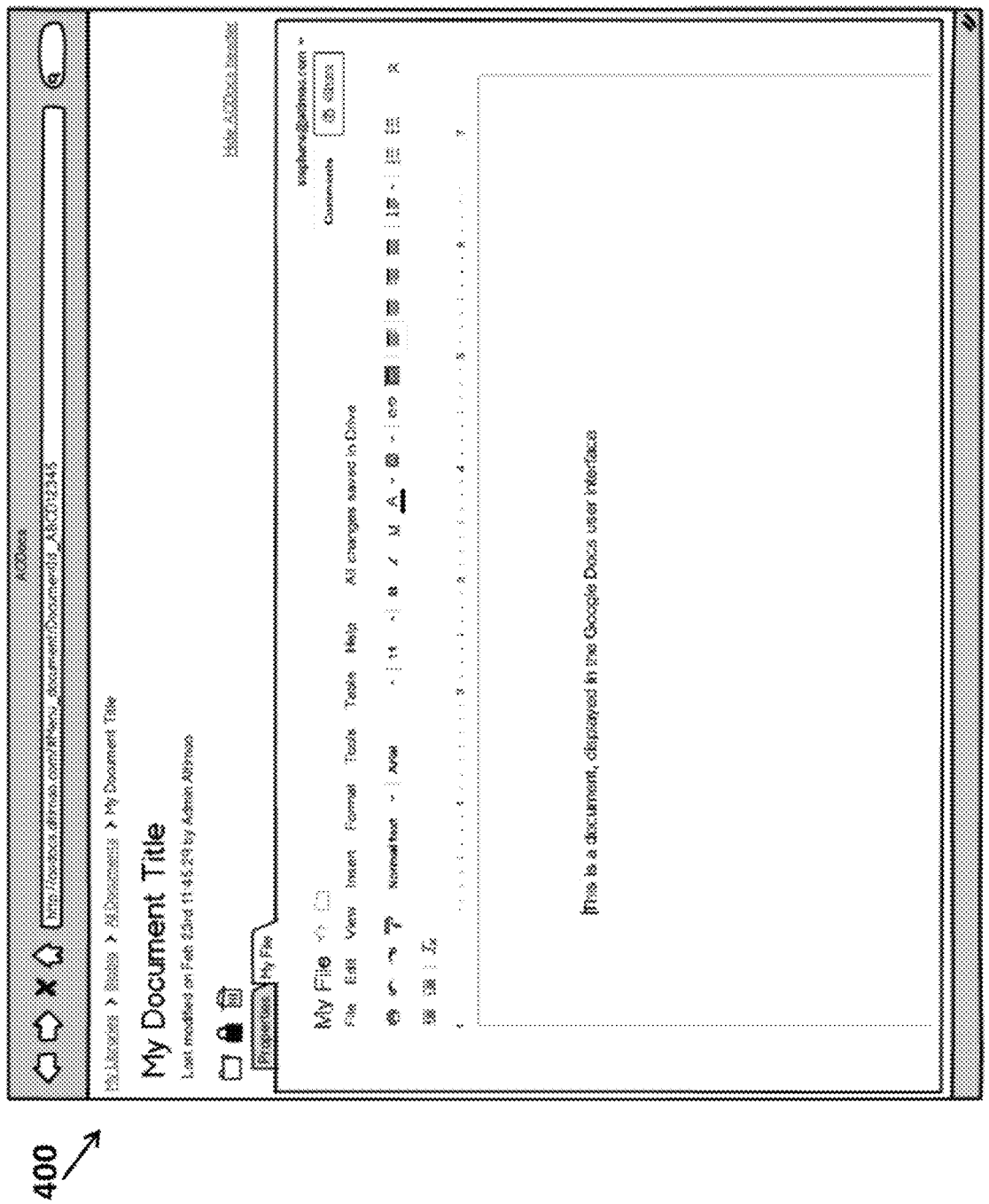
FIG. 4 illustrates an example of a document user interface of the document management system.

FIG. 3 illustrates an example of a document properties user interface 300 of the document management system and FIG. 4 illustrates an example of a document user interface 400 of the document management system. These user interfaces allow the user of the document management system to view the properties of a managed file (7) and also to view the file using, for example, a browser application as described above. In the document properties user interface in FIG. 3, a header (301) with the document title and last modified information may be displayed as well as a toolbar for document actions (302) such as edit the document, manage the document permissions, delete the document, etc. The document properties user interface may also have a tab panel (303) that allows the user to switch between the "Properties" view and the "File" view. In the "Properties" tab (as shown in FIG. 3), the document properties, such as customer name, project ID and delivery date for example, are displayed (304) and a list of the attached files (305) provide links to open the files stored in the file sharing system 1. In the "File" tab (shown in FIG. 4), the file content is displayed. In one implementation, the file may be displayed in a document viewer of the file sharing system.

Figure 5:
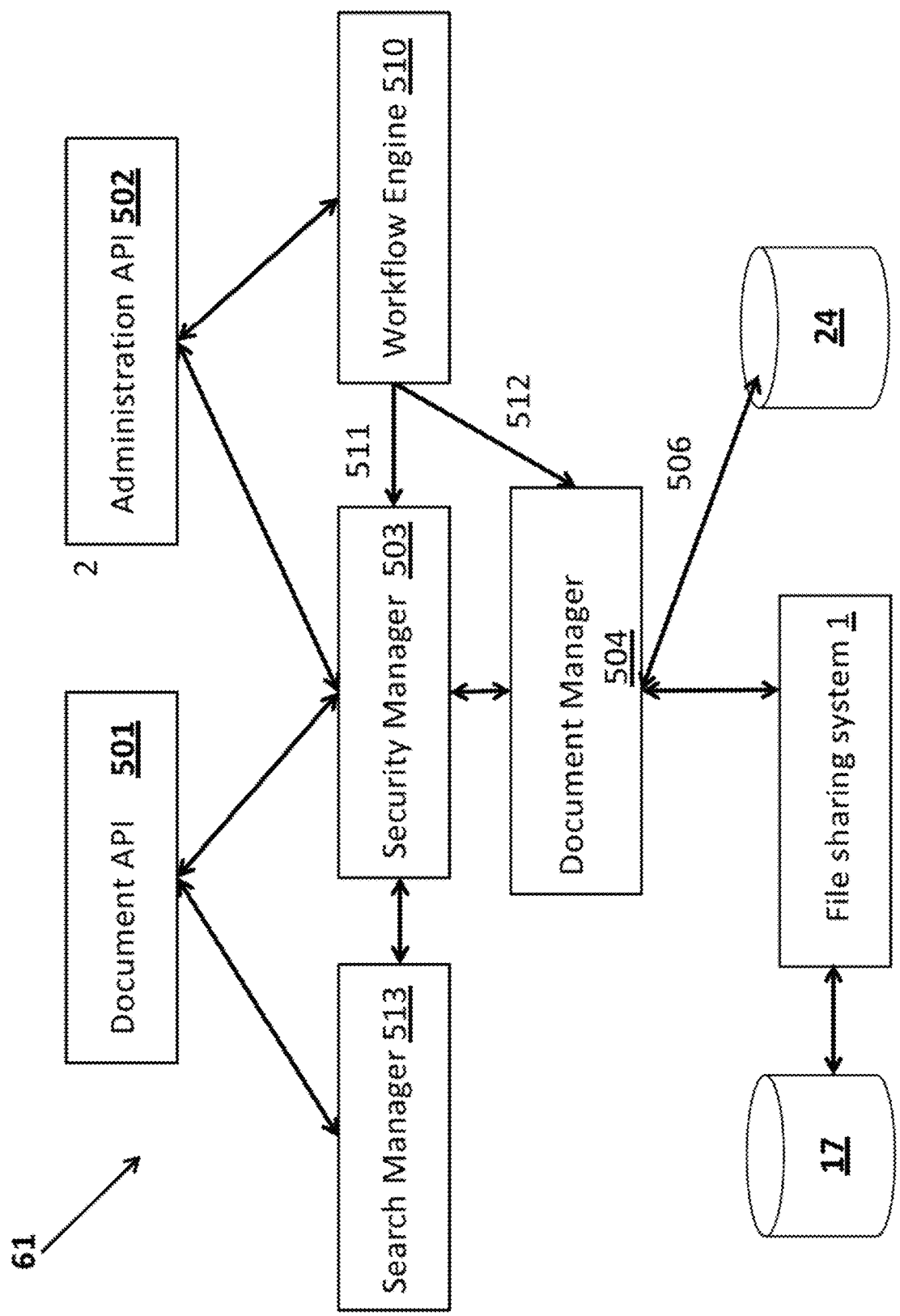
FIG. 5 illustrates more details of the document management system backend.

FIG. 5 illustrates more details of the document management system backend 61. The backend 61 may have two entry points including a document entry point 501, that may be implemented using an API, and an administration entry point 502 that may also be implemented using an API. Each component of the backend 61 shown in FIG. 5 may be implemented in a piece of hardware that may perform the operations described below or may be implemented in a plurality of lines of computer code that may be executed on the computer system(s) that implement the document management system. The document entry point 501 may process requests performed by end users when they use the system to interact with the files (such as, for example, view a document, update a document, get a list of documents, perform a search.) The administration entry point 502 may process requests performed by the administrators when they manage the configuration of the system (security parameters, database schema, workflow configuration, . . . ) The requests from the entry points may be provided to a security manager 503 of the backend 61. The security manager 503 may filter each request that includes verifying that the user performing the request has the permission to do so.

If the request is accepted, the security manager 503 may send the request to a document manager 504. The document manager 504 may manage the data model of the system. For example, the documents/files manipulated by the Document API are composed of: 1) properties (a.k.a. metadata) (506) stored in the storage 24 and 3) "attached files" which are stored in the underlying file sharing system 1 and its storage 17 described above. The Administration entry point 502 may be used to control the configuration of the security manager 503 and a workflow engine 510. The workflow engine can be used to automate document permissions 511 for the security manager 503 and document properties 512 for the document manager 504.

End users of the document management system may search for documents using the document entry point 501 which in turn passes the request to a search manager 513. The security manager 503 may filter the search results returned by the search manager 513 to ensure that the search results list displayed to the end user only shows documents that the particular end user is authorized to see.

Figure 6:
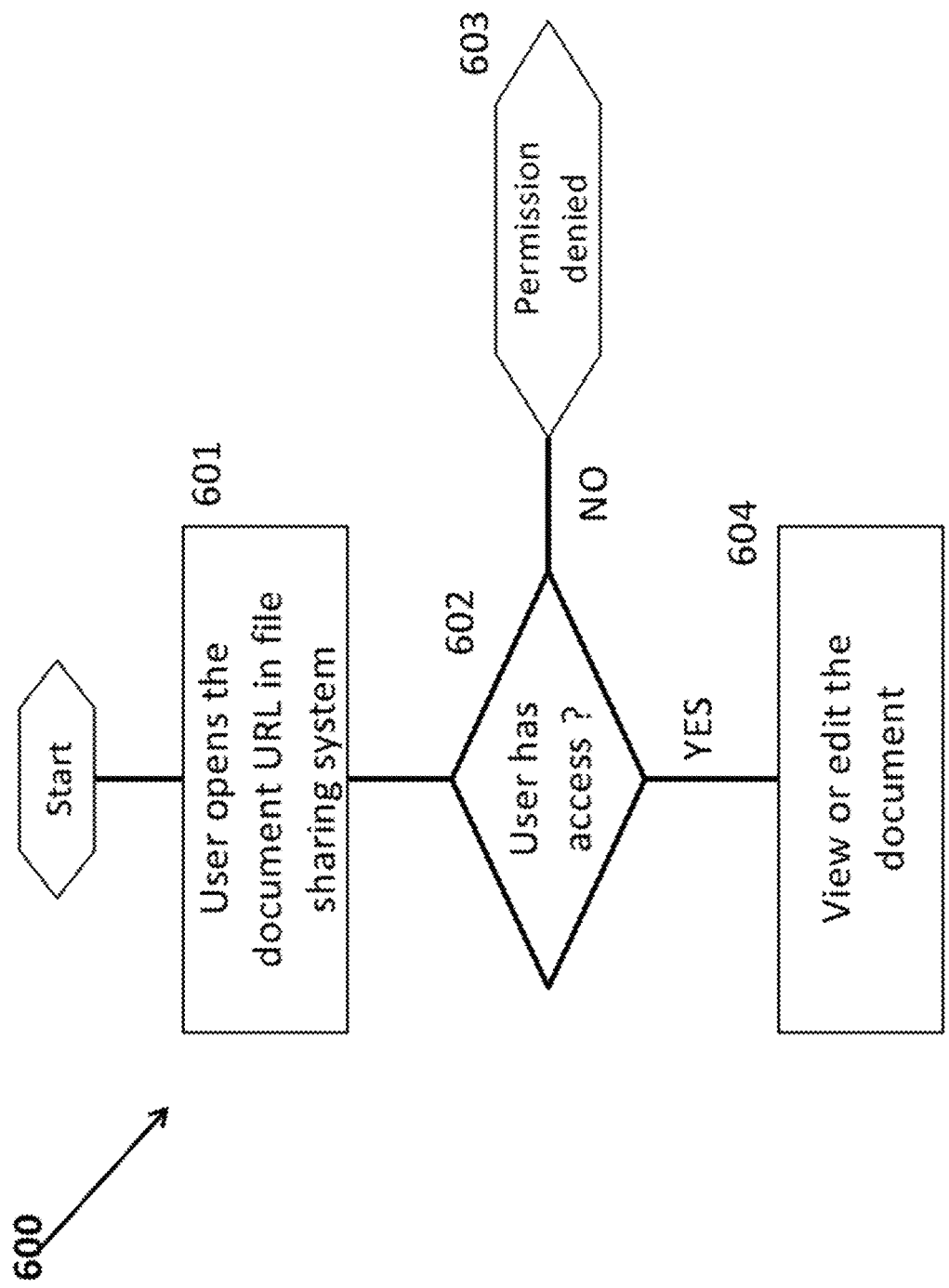
FIG. 6 is a flow chart of a user accessing a file owned by the document management system in the file sharing system.

FIG. 6 is a flow chart of a user accessing a file owned by the document management system method 600 in the file sharing system. Because the file is owned by document management system, the only actions that can be performed by the user are viewing the document or editing the document. The flow starts with the user opening the document's URL in the file sharing system 601. The file sharing systems first checks if the user is allowed to access the file 602 based on the permissions that have been set on this file by the document management system. If the user is denied access, an error message is displayed 603. If the user has access to the document, the user is allowed to performed the view or edit action 604 such as by using the user interface example in FIG. 4 described above.

Figure 7:
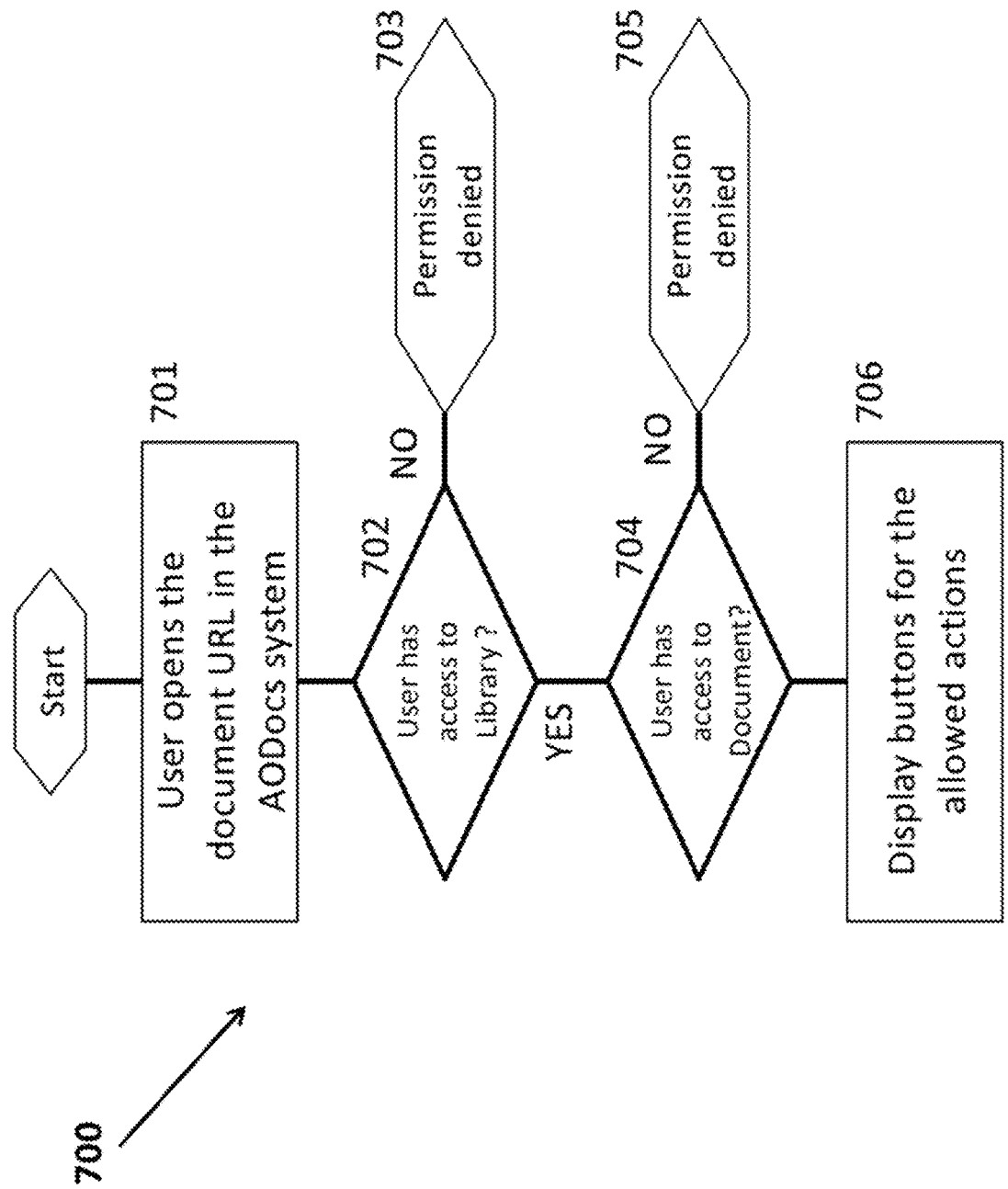
FIG. 7 is a flowchart of a user accessing a document through the document management user interface.

FIG. 7 is a flowchart of a method 700 for a user accessing a document through the document management user interface. The flow starts with the user opening the document's URL in the document management system (701). The document management system first checks if the user is allowed to access the Library containing the requested document (702). If the user is not allowed, the flow ends with an error message (703). The document management system then checks if the user is allowed to access the document (704). If the user is not allowed to access the document, the flow ends with an error message (705). If the user is allowed to access the document, the document management system determines which actions can be performed by the user and displays the corresponding action buttons (706) to the user.

Figure 8:
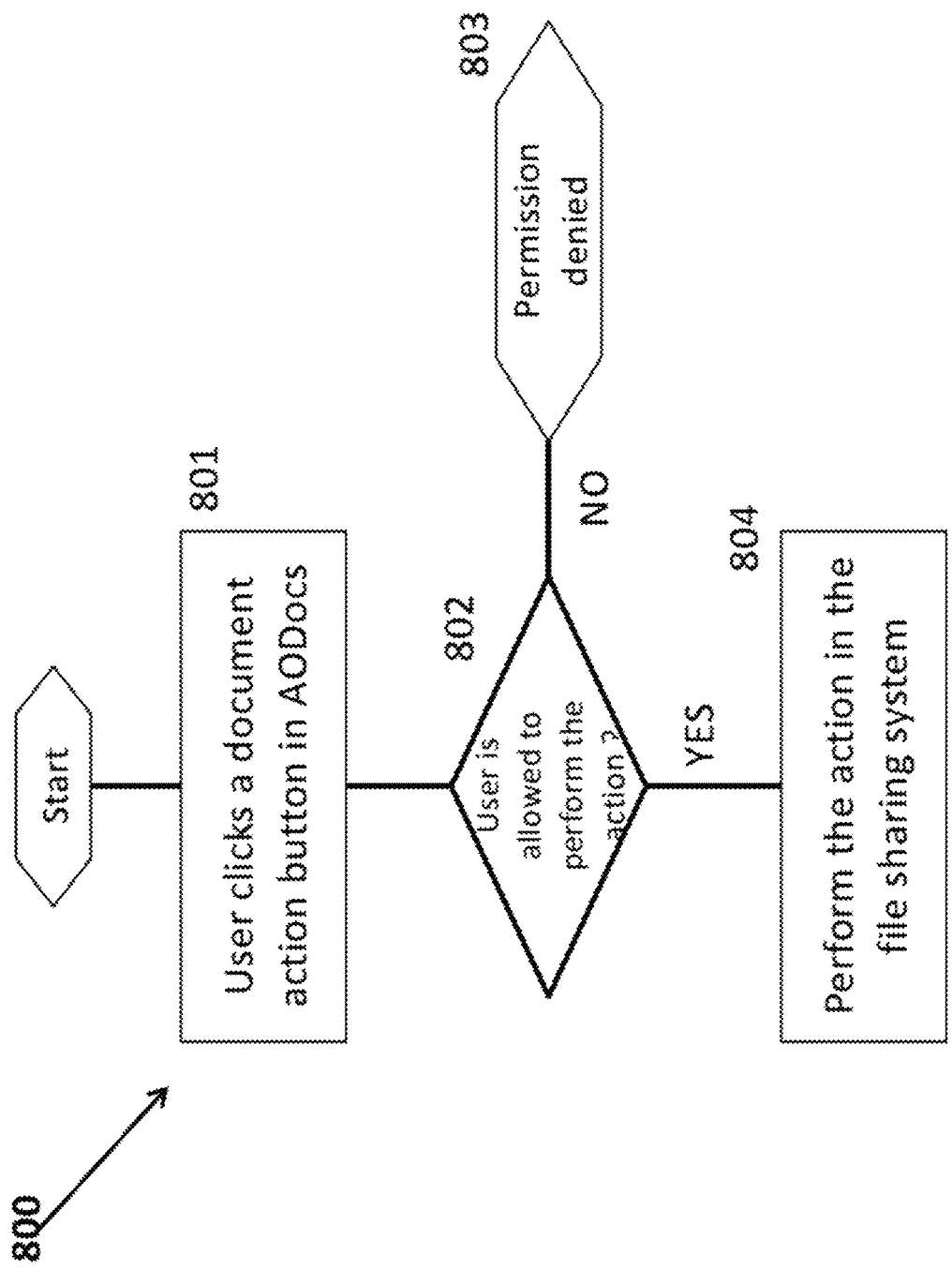
FIG. 8 is a flowchart of a user performing an action on a file through the document management user interface.

FIG. 8 is a flowchart of a method 800 for a user performing an action on a file through the document management user interface in which the action may be to modify a document's properties, delete a document, modify a document's permissions, etc. The flow starts with the user clicking on an action button (such as the buttons available at the end of the flow in FIG. 7 and shown in FIG. 3 or 4) (801). The document management system starts by verifying if the user is allowed to perform the action (702). If the action is not allowed, the flow ends with an error message (703). If the action is allowed, the document management system performs the requested action in the file sharing system (704) since the document management system is the owner of the particular file/document.

In a typical document management system, the attached files are stored directly in the document management system itself, using for example BLOB entries in a database. Typical document management systems also manage their own directory of users and groups to configure the document permissions. The document management system described above instead relies on an external file sharing system to manage the storage of attached files and the users and groups directory and the document management system manages the documents within the file sharing system by being the owner of the managed documents.

Figure 9:
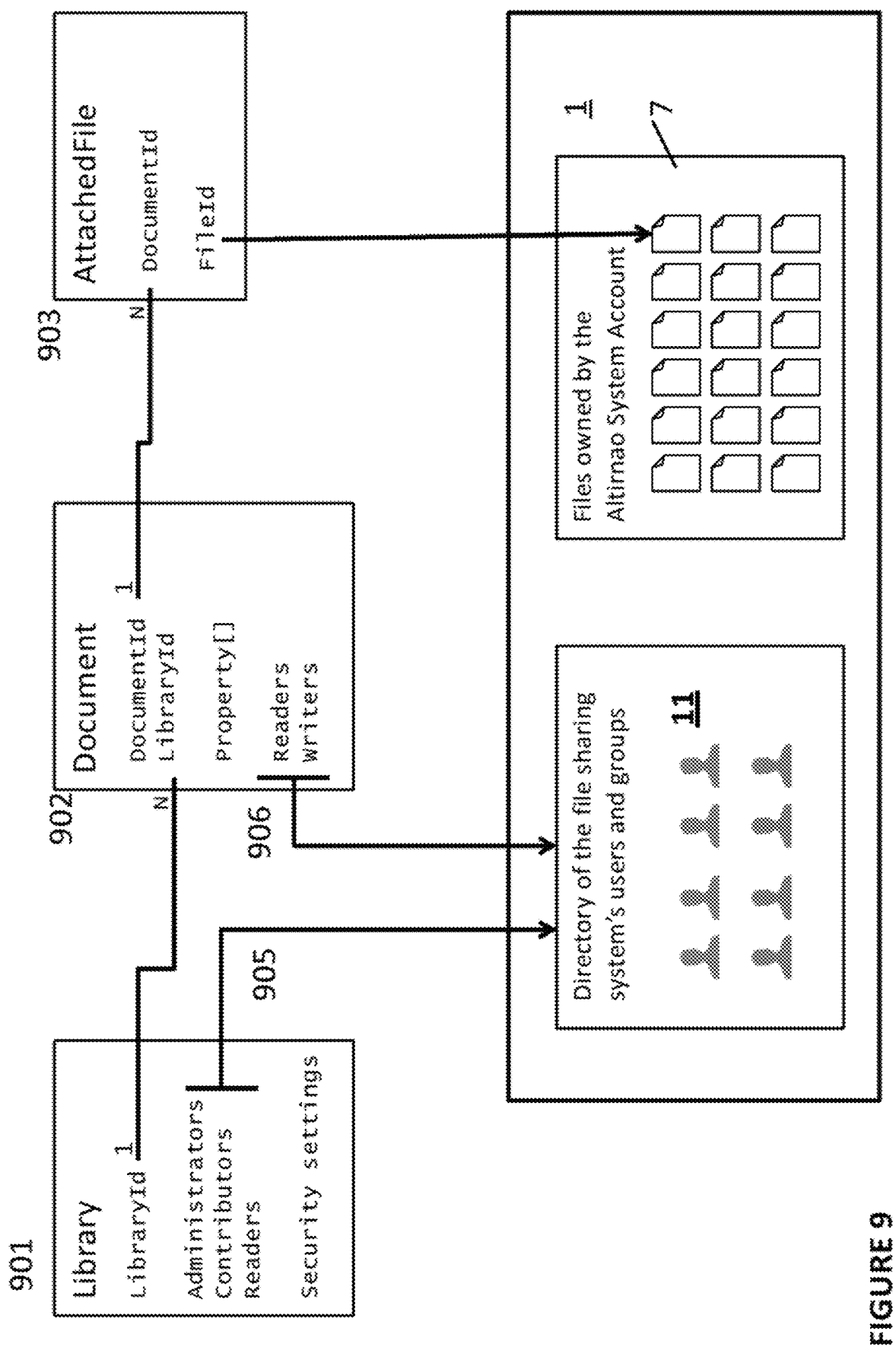
FIG. 9 illustrates a storage schema of the document management system.

FIG. 9 illustrates a storage schema 900 of the document management system. The data in the document management system may be stored as objects and the objects may include a library object 901, one or more documents objects 902 and one or more attached file objects 903. The library object 901 may be a collection of documents and has three system roles: Administrators (the users and groups who can configure the Library), Contributors (users and groups who can create and modify documents) and Readers (users and groups who can access documents). The library object may also store permissions settings for the different system roles of the collection of documents. The document object 902 may be a combination of properties (for example the title, customer name, expiration date, workflow state) and attached files for a particular managed document. Each document is related to one single library. A Document object also has security properties (Reader and Writer) indicating the users and groups having access to it. As described in FIG. 7, a user must be allowed to access to the Library (as a Library Reader, Contributor or Administrator) and be allowed to access to the document (as a Document Reader or Writer) to be able to open the document. The attached file object 903 may be a reference to a file in the file sharing system. The AttachedFile object may contain a FileId property that uniquely identifies the corresponding file object in the managed documents 7 of the file sharing system 1. The permissions in the document management system 6 may be synchronized with the file sharing system 1. As a result, the Library's system roles 905 and the Document's permission properties 906 are references to users and groups in the file sharing system's directory 11.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A document management system, comprising:
an interface to a public file system, wherein the public file system is capable of storing a plurality of electronic files, each electronic file having an owner, read access permissions and write access permissions wherein the read access permissions and the write access permissions are set only by the owner;
a computer implemented security manager, connected to the interface, that owns at least one electronic file stored in the public file system and sets the read and write access permissions for the at least one electronic file;
a database, connected to the security manager, that includes a document object associated with the at least one electronic file that stores the read access permissions for the at least one electronic file listing one or more users of the public file system that have read access to the at least one electronic file and the write access permissions for the at least one electronic file listing one or more users of the public file system that have write access to the at least one electronic file, the read access permissions and write access permissions for the at least one electronic file being synchronized with the public file system; and
wherein the public file system is capable of permitting a read access by a human user to the at least one electronic file owned by the computer implemented security manager stored by the public file system using the interface to the public file system only when the human user is included in the listing of users in the read access permissions for the at least one electronic file synchronized from the document management system.

2. The system of claim 1, further comprising a search manager, connected to the computer implemented security manager, that performs a requested document search.

3. The system of claim 1, wherein the database further comprises a library object that stores permissions settings for one or more roles in a library and links to one or more documents that are part of the library including the at least one electronic file and wherein a human user has access permission to the library and access permission to the at least one electronic file to access the at least one electronic file.

4. The system of claim 1, wherein the access permissions for the at least one electronic file further comprises one or more reader access permissions for a user to read from the at least one electronic file and one or more writer access permissions for a user to write to the at least one electronic file.

5. The system of claim 1, wherein the public file system is a public file sharing system.

6. A document management system, comprising:
an interface to a public file system, wherein the public file system is capable of storing a plurality of electronic files, each electronic file having an owner, read access permissions and write access permissions wherein the read access permissions and the write access permissions are set only by the owner;
a computer implemented security manager, connected to the interface, that owns at least one electronic file stored in the public file system and sets the read and write access permissions for the at least one electronic file;
a database, connected to the security manager, that includes a document object associated with the at least one electronic file that stores the read access permissions for the at least one electronic file listing one or more users of the public file system that have read access to the at least one electronic file and the write access permissions for the at least one electronic file listing one or more users of the public file system that have write access to the at least one electronic file, the read access permissions and write access permissions for the at least one electronic file being synchronized with the public file system; and
wherein the public file system is capable of permitting write access by a human user to the at least one electronic file owned by the computer implemented security manager stored by the public file system using the interface to the public file system only when the human user is included in the listing of users in the write access permissions for the at least one electronic file synchronized from the document management system.

7. The system of claim 6, further comprising a search manager, connected to the computer implemented security manager, that performs a requested document search.

8. The system of claim 6, wherein the database further comprises a library object that stores permissions settings for one or more roles in a library and links to one or more documents that are part of the library including the at least one electronic file and wherein a human user has access permission to the library and access permission to the at least one electronic file to access the at least one electronic file.

9. The system of claim 8, wherein the access permissions for the at least one electronic file further comprises one or more reader access permissions for a user to read from the at least one electronic file and one or more writer access permissions for a user to write to the at least one electronic file.

10. The system of claim 8, wherein the public file system is a public file sharing system.

11. A method for managing files, comprising:
receiving, through an interface of a document management system, a request from a human user to perform a read access for at least one electronic file stored in a public file system, the public file system capable of storing a plurality of electronic files, each electronic file having an owner, read access permissions and write access permissions wherein the read access permissions and the write access permissions are set only by the owner;
owning, by a computer implemented security manager of the document management system, the at least one electronic file stored in the public file system and setting the read and write access permissions for the at least one electronic file;
storing, in a database of the document management system, a document object associated with the at least one electronic file that stores the read access permissions for the at least one electronic file listing one or more users of the public file system that have read access to the at least one electronic file and the write access permissions for the at least one electronic file listing one or more users of the public file system that have write access to the at least one electronic file;
synchronizing the read access permissions and write access permissions for the at least one electronic file with the public file system; and
verifying, by the computer implemented security manager of the document management system, that the human user is included in the listing of users in the read access permissions for the at least one electronic file so that the public file system permits read access by the human user using the interface to the public file system to the at least one electronic file owned by the computer implemented security manager and stored by the public file system.

12. The method of claim 11, further comprising performing a search for a document owned by the document management system.

13. The method of claim 11, wherein the public file system is a public file sharing system.

14. The method of claim 11, further comprising displaying one or more document action buttons if a request to access the at least one electronic file is valid.

15. The method of claim 14, further comprising receiving a request, at the document management system, to perform an action on the at least one electronic file, determining if the request to perform the action is valid and performing, in the public file system, the action if the request to perform the action is valid.

16. A method for managing files, comprising:
receiving, through an interface of a document management system, a request from a human user to perform a write access for at least one electronic file stored in a public file system, the public file system capable of storing a plurality of electronic files, each electronic file having an owner, read access permissions and write access permissions wherein the read access permissions and the write access permissions are set only by the owner;
owning, by a computer implemented security manager of the document management system, the at least one electronic file stored in the public file system and setting the read and write access permissions for the at least one electronic file;
storing, in a database of the document management system, a document object associated with the at least one electronic file that stores the read access permissions for the at least one electronic file listing one or more users of the public file system that have read access to the at least one electronic file and the write access permissions for the at least one electronic file listing one or more users of the public file system that have write access to the at least one electronic file;
synchronizing the read access permissions and write access permissions for the at least one electronic file with the public file system; and
verifying, by the computer implemented security manager of the document management system, that the human user is included in the listing of users in the write access permissions for the at least one electronic file so that the public file system permits write access By the human user using the interface to the public file system to the at least one electronic file owned by the computer implemented security manager and stored by the public file system.

17. The method of claim 16, further comprising performing a search for a document owned by the document management system.

18. The method of claim 16, wherein the public file system is a public file sharing system.

19. The method of claim 16, further comprising displaying one or more document action buttons if a request to access the at least one electronic file is valid.

20. The method of claim 19, further comprising receiving a request, at the document management system, to perform an action on the at least one electronic file, determining if the request to perform the action is valid and performing, in the public file system, the action if the request to perform the action is valid.

21. A document management system, comprising:
an interface to a public file system, wherein the public file system is capable of storing a plurality of electronic files, each electronic file having an owner, read access permissions and write access permissions wherein the read access permissions and the write access permissions are set only by the owner;
a document entry point through which a human user accesses the document management system;
a computer implemented security manager, connected to the interface, that owns the at least one electronic file stored in the public file system and sets the read and write access permissions for the at least one electronic file;
a database, connected to the security manager, that includes a document object associated with the at least one electronic file that stores the read access permissions for the at least one electronic file listing one or more users of the public file system that have read access to the at least one electronic file and the write access permissions for the at least one electronic file listing one or more users of the public file system that have write access to the at least one electronic file, the read and write access permissions for the at least one electronic file being synchronized with the public file system;
the document entry point receives a request from a human user to perform a read access of the at least one electronic file; and
the computer implemented security manager verifying that the human user has read access permissions to the at least one electronic file owned by the computer implemented security manager so that the public file system permits the read access by the human user to the at least one electronic file owned by the computer implemented security manager and stored by the public file system using the document entry point only when the human user is included in the listing of users in the read access permissions for the at least one electronic file synchronized from the document management system.

22. The system of claim 21, wherein the document entry point further comprises an application programming interface.

23. The system of claim 21, further comprising a search manager, connected to the security manager, that performs a requested document search.

24. The system of claim 21, wherein the database further comprises a library object that stores permissions settings for one or more roles in a library and links to one or more documents that are part of the library including the at least one electronic file and wherein a human user has access permission to the library and access permission to the at least one electronic file to access the at least one electronic file.

25. The system of claim 21, wherein the access permissions for the at least one electronic file further comprises one or more reader access permissions for a user to read from the at least one electronic file and one or more writer access permissions for a user to write to the at least one electronic file.

26. The system of claim 21, wherein the public file system is a public file sharing system.

27. A document management system, comprising:
an interface to a public file system, wherein the public file system is capable of storing a plurality of electronic files, each electronic file having an owner, read access permissions and write access permissions wherein the read access permissions and the write access permissions are set only by the owner;
a document entry point through which a human user accesses the document management system;
a computer implemented security manager, connected to the interface, that owns at least one electronic file stored in the public file system and sets the read and write access permissions for the at least one electronic file;
a database, connected to the security manager, that includes a document object associated with the at least one electronic file that stores the read access permissions for the at least one electronic file listing one or more users of the public file system that have read access to the at least one electronic file and the write access permissions for the at least one electronic file listing one or more users of the public file system that have write access to the at least one electronic file, the read and write access permissions for the at least one electronic file being synchronized with the public file system;
the document entry point receives a request from a human user to perform a write access of the at least one electronic file; and
the computer implemented security manager verifying that the human user has write access permissions to the at least one electronic file owned by the computer implemented security manager so that the public file system permits the write access by the human user to the at least one electronic file owned by the computer implemented security manager and stored by the public file system using the document entry point only when the human user is included in the listing of users in the write access permissions for the at least one electronic file synchronized from the document management system.

28. The system of claim 27, wherein the document entry point further comprises an application programming interface.

29. The system of claim 27, further comprising a search manager, connected to the security manager, that performs a requested document search.

30. The system of claim 27, wherein the database further comprises a library object that stores permissions settings for one or more roles in a library and links to one or more documents that are part of the library including the at least one electronic file and wherein a human user has access permission to the library and access permission to the at least one electronic file to access the at least one electronic file.

31. The system of claim 27, wherein the access permissions for the at least one electronic file further comprises one or more reader access permissions for a user to read from the at least one electronic file and one or more writer access permissions for a user to write to the at least one electronic file.

32. The system of claim 27, wherein the public file system is a public file sharing system.

\* \* \* \* \*